United States Patent [19]

Bethe

[11] Patent Number: 5,024,107

[45] Date of Patent: Jun. 18, 1991

[54] PRESSURE OR FORCE SENSOR HAVING AN AXIALLY SYMMETRICAL PRESSURE OR FORCE-RECEIVING CIRCULAR PLATE SPRING

[75] Inventor: Klaus W. B. Bethe, Braunschweig, Fed. Rep. of Germany

[73] Assignee: U.S. Philips Corporation, New York, N.Y.

[21] Appl. No.: 378,343

[22] Filed: Jul. 11, 1989

[30] Foreign Application Priority Data

Jul. 13, 1988 [DE] Fed. Rep. of Germany ....... 3823673

[51] Int. Cl.$^5$ ................................................ G01L 1/22
[52] U.S. Cl. .................................... 73/862.65; 73/720; 73/726; 338/4
[58] Field of Search ...................... 73/862.65, 721, 727, 73/720, 726; 338/4, 5; 177/211

[56] References Cited

U.S. PATENT DOCUMENTS 4,146,864 6/1978 Bethe ........................................ 338/5
4,811,610 3/1989 Gassmann ......................... 73/862.65

FOREIGN PATENT DOCUMENTS 922982 10/1961 United Kingdom .

Primary Examiner—Donald O. Woodiel
Attorney, Agent, or Firm—Brian J. Wieghaus

[57] ABSTRACT

The invention relates to a pressure or force sensor having an axially symmetrical, force-receiving circular plate spring which has a reinforced edge region (5) which serves as a support on a carrier, said spring being provided with strain gauges. To prevent radial sliding motions between the carrier and the circular plate spring the carrier is fitted at the reinforced edge region of the circular plate spring in an annular zone, in which the radial expansion is substantially zero.

10 Claims, 1 Drawing Sheet

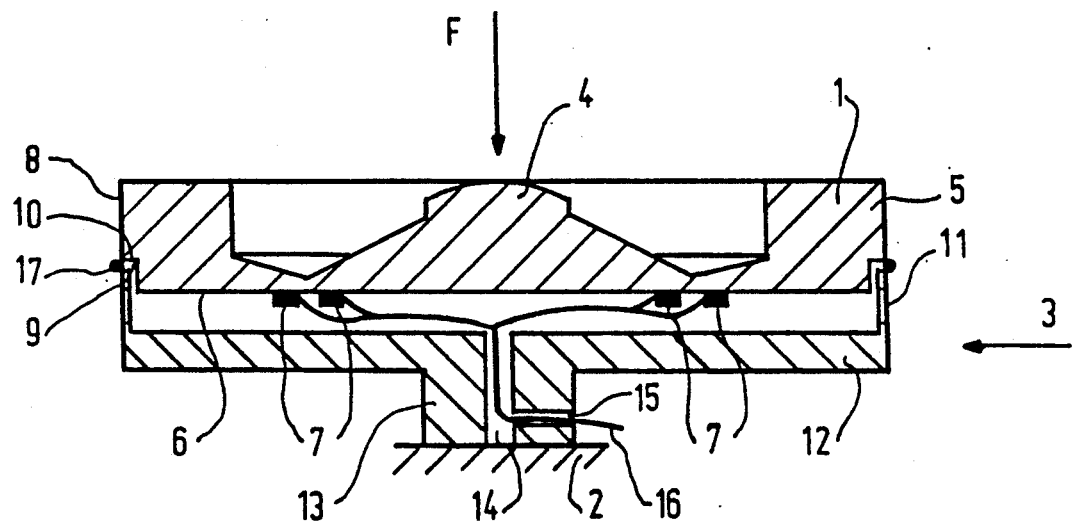

PRESSURE OR FORCE SENSOR HAVING AN AXIALLY SYMMETRICAL PRESSURE OR FORCE-RECEIVING CIRCULAR PLATE SPRING

BACKGROUND OF THE INVENTION

The invention relates to a pressure or force sensor having an axially symmetrical pressure or force-receiving circular plate spring having a reinforced edge region which serves as a support on a carrier, said spring being provided with strain gauges.

Such a force or load sensor is disclosed in the DE-AS 1129317. Said force sensor has an axially symmetrical circular plate spring having a reinforced edge region and also a reinforced center portion where the force is fed into. At the positions where the degree of expansion or compression of the circular plate spring is highest, strain gauges are provided, from which an electrical signal which corresponds to the force acting on the force-measuring cells is derived. Three bolts which are shifted through 120° and act on the reinforced, stiffened edge region of the circular plate spring bear against a base support in the form of a carrier. In this force sensor, when the circular plate spring is loaded, an outward deformation of the reinforced edge region also occurs in addition to the desired bending deformation. This results in a radial relative motion between the bolts and the base support. This radial deflection of the reinforced edge region of the circular plate spring is greater as the radius of the circular plate spring is smaller, the other dimension remaining the same. In addition, sliding motions occur between the bolts and the basic support in response to temperature variations. Because of these effects the electrical voltage-force-characteristic of such a force-measuring cell evidences a hysteresis. It was also found that the characteristic is not properly reproducible and that it changes when the temperature fluctuates.

SUMMARY OF THE INVENTION

It is therefore an object of the invention to provide a load sensor in which a radial sliding motion between the circular plate spring and the carrier is avoided.

In a load sensor of the type defined in the opening paragraph, this object is achieved in that the carrier is fitted at the reinforced edge region of the circular plate spring in an annular zone in which the radial expansion is substantially zero.

It has been found for the load or force sensor of the invention that on loading an inward tilt of the reinforced edge region occurs in addition to the desired deformation of the circular plate spring, more specifically around an annular line on the skirt of the reinforced edge region, which represents the radial expansion-free zone. As the pressure or force sensor in accordance with the invention is of such a structure that the carrier is connected to the reinforced edge region of the circular plate spring in that region in which the radial expansion is substantially zero, no sliding motion between the carrier and the circular plate spring occurs on loading. In the pressure or force sensor of the invention there is a reduced hysteresis of the electrical voltage-force characteristic as compared with the prior-art force sensor, while no relative motion is produced between the carrier and the circular plate spring on loading. Moreover, the characteristic is reproducible to a very great extent. Also in the event of temperature fluctuations the characteristic changes only in an accurately reproducible, unambiguous manner.

In a further extension of the invention, the circular plate spring is provided at the exterior edge of the reinforced edge region which faces the carrier with an annular constriction which is engaged by the carrier. The construction is in the form of a resilient metal pipe, a surface of the constriction which extends towards the end face of the metal pipe and serves as a supporting surface extending to the substantially radial expansion-free annular zone. This results in a pressure or force sensor which is simple to manufacture, and in which the circular plate spring is provided with a uniform constriction extending along the exterior edge. A thin resilient metal pipe which absorbs a tilt of the circular plate spring at the reinforced edge region serves as a carrier. The support which serves as a supporting rest for the constriction is preferably of a substantially square structure in cross-section, and is preferably welded, soldered or cemented to the opposite end face of the elastic metal pipe. The carrier may alternatively be in the form of a resilient metal pipe having a projecting portion (thickened wall portion) which extends into the interior of the metal pipe, the pipe engaging a circular groove which extends in the substantially radial expansion-free annular zone.

The end face of the resilient metal pipe, remote from the circular plate spring, is in the form of a resilient plate which is provided with a centrically arranged supporting piece which serves to keep both oblique loads and unevenness of the basic support on which the supporting piece rests, away from the circular plate spring. It is alternatively possible to integrate elastic bending elements directly in the supporting pieces to compensate for oblique loads and unevenness. So as to reduce the temperature sensitivity of the force-measuring cell according to the invention, the carrier is made of thin-walled resilient metal pipe and the resilient plate is preferably made as one integral whole from the same material as the circular plate spring.

To increase the measuring sensitivity, that side of the circular plate spring that faces the carrier is basically flat and the other side of the circular plate spring between the reinforced edge region and a reinforced center part which serves as a force-inserting point is profiled. Strain gauges being arranged in the radial or tangential direction in the regions having the greatest expansion or compression. The reinforced center part provides a sufficiently large flat area for the feed-in of a pressure or a force to the circular plate spring.

BRIEF DESCRIPTION OF THE DRAWINGS

An embodiment of the invention will now be described in greater detail with reference to the accompanying drawing which shows a cross-sectional view through a force sensor.

DESCRIPTION OF THE PREFERRED EMBODIMENTS

The force or load sensor comprises an axially symmetrical circular plate spring 1 and a carrier 3 which supports the circular plate spring 1 and is supported by a substrate 2. The circular plate spring 1 which is suitable for sensing force has a reinforced center portion 4 which serves as a force feed-in point which, in order to obtain a defined direction of load effect, is dome-shaped. The circular plate spring 1 has a reinforced, rigid edge region 5, which serves as a support for the carrier 3. In order to obtain an appropriate radial expansion, the circular plate spring 1 has a thickness which varies across the radius. A channel-shaped groove which extends around the center portion 4 is present between the reinforced edge region 5 and the center portion 4. That side 6 of the circular plate spring 1 which is remote from the force feed-in point is basically flat. On this side 6 the strain gauges 7 are provided in the areas of the greatest expansion or compression, in the radial or tangential direction.

An annular, in cross-section rectangular constriction 9 is present at the interior edge 8 of the reinforced edge region 5 in the direction of the carrier 3. The surface of the constriction 9 which is formed as a supporting surface 10 and points towards the carrier 3 and extends in parallel with the side 6 of the circular plate spring 1 is located in an annular zone of the circular plate spring, in which the radial expansion is substantially zero. The carrier 3 is in the form of a thin-walled resilient metal pipe 11 which engages the constriction 9 of the circular plate spring 1. The supporting surface 10 and the end faces of the resilient metal pipe 11 are connected by a welded joint 17. The connection may alternatively be made by soldering or cementing. When a load is applied, a tilting of the reinforced edge region 5 occurs in addition to the desired deformation of the circular plate spring 1, more specifically around a point of the reinforced edge region 5 which is located at the interface (welded joint 17) between the supporting surface 10 and the end face of the thin-walled resilient metal pipe 11. Consequently no sliding motion occurs between the circular plate spring 1 and the carrier 3. The resilient metal pipe 11 has for its sole purpose to flexibly absorb a tilting motion of the reinforced edge region 5.

That end face of the thin-walled resilient metal pipe 11 that is remote from the circular plate spring 1 terminates in a resilient plate 12. This resilient plate 12 has a centrally located supporting piece 13 which bears on the substrate 2. A bore 14 extends in the center of the supporting piece 13. A further bore 15 made between the bore 14 and the exterior edge of the supporting piece 13 serves, as does also the bore 14, as a feed guide for lines 16 which lead to the strain gauges 7. The carrier 3 which is preferably made as one integral unit and is formed by the thin-walled resilient metal pipe 11 and the resilient plate 12 has also for its object to shield the circular plate spring from both oblique forces and unevennesses of the substrate 2. The carrier 3 and the circular plate spring 1 must be made from the same raw material.

The force sensor can also be used for sensing tensile forces. For that purpose the reinforced center portion 4 which serves as a force feed-in point must be provided with means via which tensile forces can be applied.

The connection of the circular plate spring in its reinforced edge region to the line of the annular zone which, as a pivoting point of the edge tilt, has a zero radial expansion, can furthermore be used for a pressure sensor with a profiled or flat circular plate spring between the reinforced edge region.

I claim:

1. A load sensor comprising a carrier, an axially symmetrical load receiving circular plate spring having a mainly flat side, an opposing profiled side, and a reinforced edge region supported on said carrier, and strain gauges disposed on said circular plate spring, characterized in that:

said circular plate spring is supported by said carrier at an annular zone of said reinforced edge region in which the radial expansion of said spring is substantially zero under load.

2. A load sensor as claimed in claim 1, wherein said carrier comprises a resilient tubular portion terminating at an end face, and said reinforced edge region of said plate spring has an annular constriction with a surface supported by said end face of said resilient tubular portion, said surface being substantially free of radial expansion.

3. A load sensor as claimed in claim 2, characterized in that said constriction is substantially square-angled in cross-section, said end face of the resilient tubular portion being fixed to said surface of said constriction.

4. A load sensor as claimed in claim 3, characterized in that the end of the resilient tubular portion remote from the circular plate spring comprises a resilient plate having a centrally located support.

5. A load sensor as claimed in claim 4, wherein the side of the circular plate spring facing the carrier is mainly flat and the other side of the circular plate spring has a reinforced central portion which is profiled for serving as a force feed-in point, and said strain gauges being arranged in the radial or tangential direction of said circular plate spring in the regions of the highest expansion or compression, respectively.

6. A load sensor as claimed in claim 3, wherein the side of the circular plate spring facing the carrier is mainly flat and the other side of the circular plate spring has a reinforced central portion which is profiled for serving as a force feed-in point, and said strain gauges being arranged in the radial or tangential direction of said circular plate spring in the regions of the highest expansion or compression, respectively.

7. A load sensor as claimed in claim 2, wherein said carrier, at an end face of the resilient tubular portion remote from the circular plate spring, comprises a resilient plate having a centrally located support.

8. A load sensor as claimed in claim 7, wherein the side of the circular plate spring facing the carrier is mainly flat and the other side of the circular plate spring has a reinforced central portion which is profiled for serving as a force feed-in point, and said strain gauges being arranged in the radial or tangential direction of said circular plate spring in the regions of the highest expansion or compression, respectively.

9. A load sensor as claimed in claim 2, wherein the side of the circular plate spring facing the carrier is mainly flat and the other side of the circular plate spring has a reinforced central portion which is profiled for serving as a force feed-in point, and said strain gauges being arranged in the radial or tangential direction of said circular plate spring in the regions of the highest expansion or compression, respectively.

10. A load sensor as claimed in claim 1, wherein the side of the circular plate spring facing the carrier is mainly flat and the other side of the circular plate spring has a reinforced central portion which is profiled for serving as a force feed-in point, and said strain gauges being arranged in the radial or tangential direction of said circular plate spring in the regions of the highest expansion or compression, respectively.

* * * * *